Patented Jan. 14, 1936

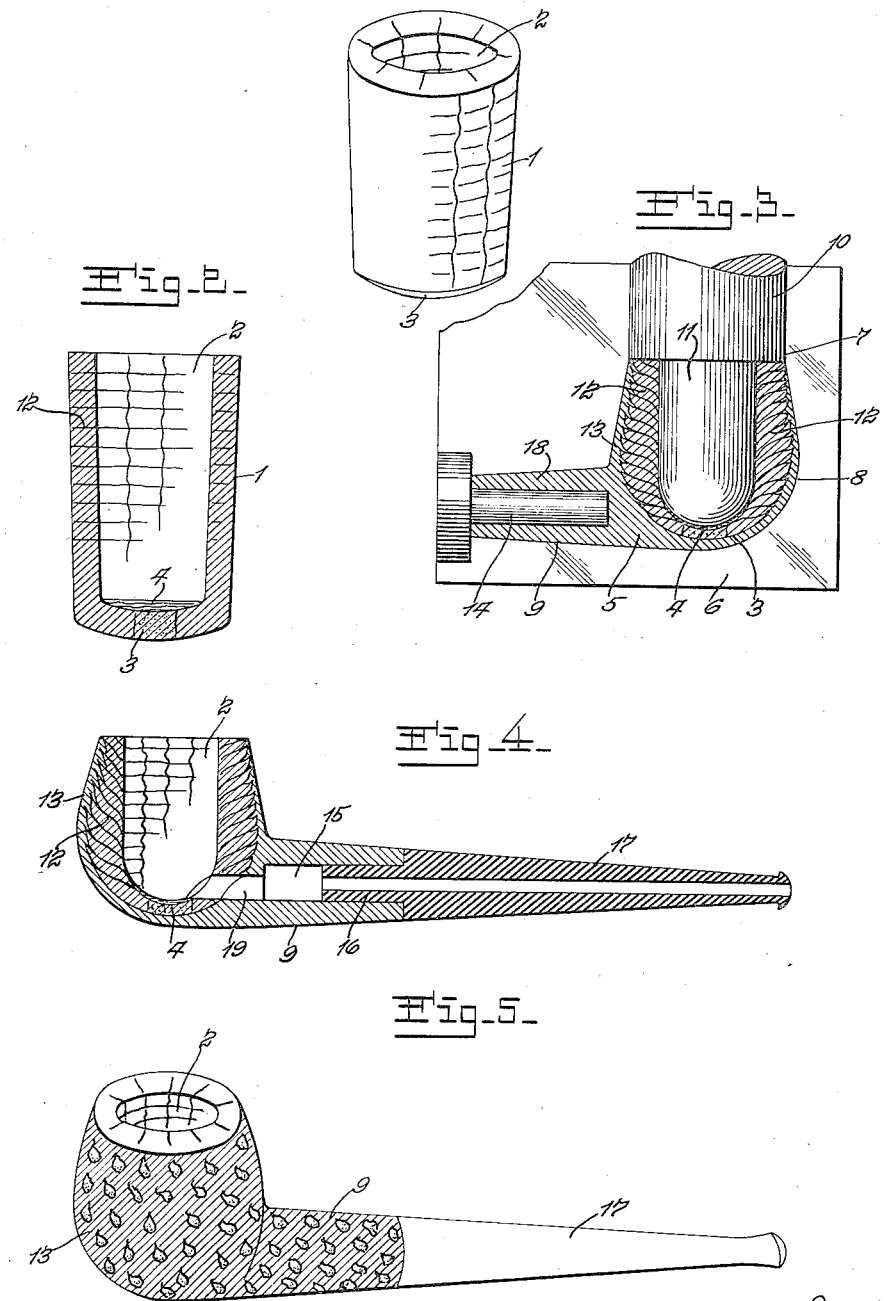

2,027,457

UNITED STATES PATENT OFFICE 2,027,457

CORN COB PIPE AND METHOD OF MAKING SAME

Reg M. Strutz and Edwin J. Steuterman, Boonville, Mo.

Application December 3, 1934, Serial No. 755,652

8 Claims. (Cl. 18—59)

This invention relates to corn cob pipes and the method of making the same.

Objects of the invention are to provide an improved corn cob pipe that is more compact and durable than corn cob pipes of usual construction, which advantage is obtained in part by rearrangement of the fibrous structure of the cob, notwithstanding that the cob portion of the pipe contains a thinner wall section than ordinary cob pipes; to provide an improved corn cob pipe in which the stummel, comprising the bowl and an extruded stem portion of an adhesively united enclosing structure of the bowl, is of a substantially integral molded nature; to provide an improved cob pipe retaining the advantages of corn cob pipes and, additionally, impregnated with a flavoring substance, such as honey or rum or other flavoring preparation; to provide an improved corn cob pipe having its lower portion including a thicker section of compound to obtain additional strength and durability; to provide a corn cob pipe having and maintaining a higher lustre and sheen and finish than has been possible to obtain in corn cob pipes of different construction; and to provide a pipe having the interior of the bowl composed of corn cob and embedded in a compressed and solidified plastic substance forming an ornametal exterior finish on and around all or any desired portion of the cob bowl and including an extruded stem portion.

Another object of the invention is to provide an improved method for making a corn cob pipe embodying any or all of the improved features of construction above or hereinafter disclosed.

Other objects of the invention will be readily apparent from the following description, reference being made to the annexed drawing, in which—

Fig. 1 is a perspective view of a section of corn cob formed preparatory for use in a corn cob pipe embodying the present invention.

Fig. 2 is a vertical diametrical sectional view of the corn cob section that is shown in perspective in Fig. 1.

Fig. 3 is a sectional view showing the cob section and the united extruded stummel portion compressed within a mold, the distortion of the fibers of the cob being illustrated and the mold being diametrically shown.

Fig. 4 is a vertical longitudinal sectional view of the pipe and stem.

Fig. 5 is a perspective view of the finished pipe.

In Fig. 1, a section of a corn cob is illustrated having its outer surface 1 formed by removing the usual chaff portions of the cob, and having its interior portion removed to provide a bowl opening 2, leaving an integral bottom wall 3.

Next, if desired, a quantity of exterior granular particles, that had been removed from the exterior of the cob to provide the surface 1, may be placed in the bottom of the bowl, as indicated at 4 (Fig. 2). These particles may be treated or flavored with any desirable flavoring preparation, such as honey, rum, or other selected flavoring preparation, to improve the taste and flavor of the smoke.

Next, a quantity of plastic material 5, in the class of bakelite or the phenol plastics, is placed in a heated mold 6 having a cavity 7 at least large enough and deep enough to receive the cob bowl, and having the lower portion 8 enlarged in excess of the diameter of the cob bowl and provided with a laterally extended portion 9. The cob bowl is then inserted in the cavity in the heated mold and a heated ram or plunger 10 having a downwardly extended cylindrical portion 11 is forced into the mold opening 7, the cylindrical extended portion 11 entering the bowl opening 2. The heated ram or plunger is forced downwardly with pressure sufficient to compress the cob bowl from approximately the dimensions shown in Fig. 2 of the drawing to the dimensions shown in Fig. 3, distorting the fibers 12 by twisting the fibers. The twisting of the fibers is effected by the descending pressure of the ram or plunger portion 11 against the inner ends of the fibers while the outer ends of the fibers are engaged by the surrounding plastic material 5.

The plastic material is initially placed in the mold in a dry and powdered state and, under the influence of the heat, assumes the plastic condition required to permit said material to form a layer 13 completely embedding the lower end of the cob bowl and extending upwardly around the cob bowl to any height desired.

A die element 14 extends axially into the opening 9, and the plastic material 5 is forced into said opening 9 around the die element 14, which forms a cylindrical bore or recess 15 for the subsequent reception of the reduced end 16 of the bit or stem 17.

After the cob bowl and plastic material have been compressed to the desired degree within the mold, the ram or plunger 10 and the mold element 11 are removed, the mold is opened, and the pipe stummel, comprising the cob bowl and the rigidly united covering 13 and laterally extended part 18, is removed.

The pressure applied to the pipe structure in a heated condition thoroughly bonds the plastic substance with the cob bowl, and also thoroughly impregnates the lower end of the cob bowl with the flavoring substance contained in the granular particles 4.

After the pipe stummel is removed from the mold, a hole 19 is formed through the solidified plastic material 5 and through the lower end portion of the cob bowl, as shown in Fig. 4.

When compressed and otherwise treated in the manner explained, the cob bowl will not expand or otherwise become distorted after removal from the mold, but will retain its molded shape, and the exterior surface of the solidified plastic material may be polished and finished.

The structure and the procedure constituting this invention may be varied within the scope of equivalent limits without departure from the nature and principle thereof. The plastic material may be molded in various shapes and forms, the drawing being only for the purpose of illustration in this regard.

We claim:—

1. A pipe comprising a longitudinally compressed cob bowl, in combination with a stem portion of solidified plastic material embedding the lower end of the bowl and adhesively united thereto and holding said bowl longitudinally compressed.

2. A pipe comprising a longitudinally compressed cob bowl, a quantity of flavor impregnated substance attached to the inside of the bottom of the bowl, and a solidified plastic stem portion enclosing and holding said bowl longitudinally compressed and opening into the lower end of said cob bowl.

3. A pipe comprising a solidified plastic exterior portion, and a cob bowl compressed in said exterior portion.

4. The method of making a pipe which consists in compressing a cob bowl in a heated plastic composition in a mold, molding a portion of the plastic composition to form a stem, and causing said composition to unite adhesively with the cob bowl.

5. The method of making a pipe which consists in compressing a cob bowl in a heated plastic composition in a mold, molding a portion of the plastic composition to form a stem, causing said composition to unite adhesively with the cob bowl, and simultaneously impregnating the lower inner portion of the cob bowl with a flavoring substance.

6. The method of making a pipe which consists in forming a hollow cob section with an integral wall at one end, compressing said cob section longitudinally within a plastic composition in a heated state in a mold while preventing internal collapse of said cob section, removing the cob section and solidified plastic composition from the mold, and finishing the pipe.

7. The method of forming a pipe which consists in placing a hollow section of corn cob in a heated plastic composition in a mold, subjecting the cob section to longitudinal pressure while preventing internal collapse thereof to cause said cob section to become embedded in said plastic composition, removing the solidified plastic composition and cob bowl from the mold, and finishing the pipe.

8. A pipe comprising a longitudinally compressed cob bowl having the fibers distorted and twisted and having an opening into the bottom of the bowl, and a solidified plastic stem portion molded on the bowl and embedding the outer ends of the distorted and twisted fibers and opening into said opening and having a hole communicating with said opening.

REG M. STRUTZ.
EDWIN J. STEUTERMAN.